United States Patent
Cheng et al.

(10) Patent No.: US 9,578,024 B2
(45) Date of Patent: Feb. 21, 2017

(54) CONTINUOUS AUTHENTIC OF MOBILE DEVICE USERS

(71) Applicant: SRI International, Menlo Park, CA (US)

(72) Inventors: Hui Cheng, Bridgewater, NJ (US); Omar Javed, Franklin Park, NJ (US); JieJie Zhu, East Windsor, NJ (US)

(73) Assignee: SRI INTERNATIONAL, Menlo Park, CA (US)

( * ) Notice: Subject to any disclaimer, the term of this patent is extended or adjusted under 35 U.S.C. 154(b) by 0 days.

(21) Appl. No.: 14/832,524

(22) Filed: Aug. 21, 2015

(65) Prior Publication Data

US 2016/0182503 A1    Jun. 23, 2016

Related U.S. Application Data

(60) Provisional application No. 62/181,247, filed on Jun. 18, 2015, provisional application No. 62/093,460, filed on Dec. 18, 2014.

(51) Int. Cl.
| | |
|---|---|
| *G06F 21/00* | (2013.01) |
| *H04L 29/06* | (2006.01) |
| *H04W 12/06* | (2009.01) |
| *G06F 21/31* | (2013.01) |
| *H04W 12/08* | (2009.01) |
| *G06F 21/32* | (2013.01) |

(52) U.S. Cl.
CPC ......... *H04L 63/0861* (2013.01); *G06F 21/316* (2013.01); *G06F 21/32* (2013.01); *H04L 63/12* (2013.01); *H04W 12/06* (2013.01); *H04W 12/08* (2013.01)

(58) Field of Classification Search
CPC .................................................... G06F 21/316
USPC ............................................................. 727/7
See application file for complete search history.

(56) References Cited

U.S. PATENT DOCUMENTS

2008/0252727 A1* 10/2008 Brown .............. G06F 17/30793
348/143

OTHER PUBLICATIONS

Kwapisz, Jennifer R. et al., Cell Phone-based Biometric Identification, Biometrics: Theory Applications and Systems (BTAS), 2010 Fourth IEEE International Conference on Biometrics Compendium, IEEE (Sep. 2010).

* cited by examiner

*Primary Examiner* — Longbit Chai
(74) *Attorney, Agent, or Firm* — Barnes & Thornburg LLP

(57) ABSTRACT

Technology for performing continuous authentication of a mobile device utilizes user activity context data and biometric signature data related to the user. A biometric signature can be selected based on the activity context, and the selected biometric signature can be used to verify the identity of the user.

18 Claims, 13 Drawing Sheets

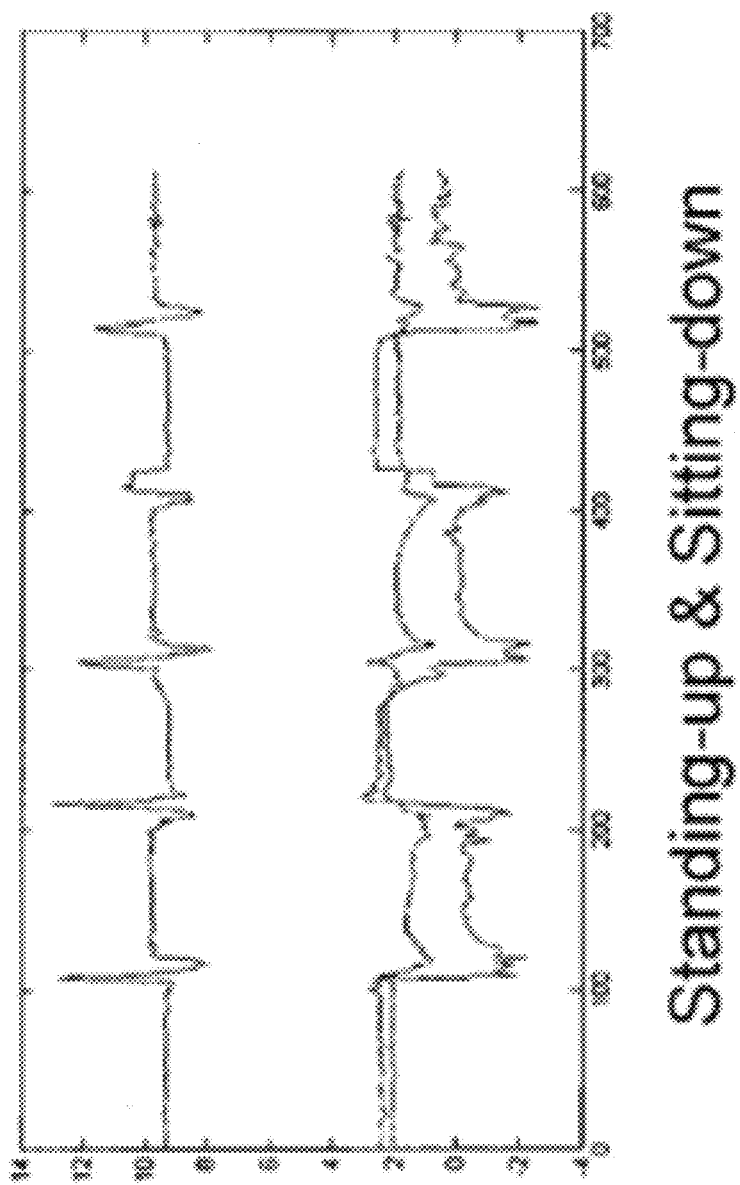

Pick up a phone call

CONTINUOUS AUTHENTIC OF MOBILE DEVICE USERS

PRIORITY

This application claims priority to and the benefit of U.S. Provisional Patent Application 62/093,460, filed Dec. 18, 2014, and U.S. Provisional Patent Application 62/181,247, filed Jun. 18, 2015, each of which is incorporated herein by this reference in its entirety.

GOVERNMENT RIGHTS

This invention was made in part with government support under contract number FA8750-13-C-0265 awarded by Defense Advanced Research Projects Agency (DARPA). The Government has certain rights in this invention.

BACKGROUND

Today, to use a mobile device, one typically needs to first unlock the mobile device. Even for an emergency call, a user may need to click on a number of buttons to activate a mobile device, enter a password, enter phone numbers, etc. Pushing a button and typing in numbers requires concentration and precision operation, which may prove difficult in certain situations, especially in time-critical conditions. The current ways utilized to access a mobile device are often tedious and sometimes may delay important and time-sensitive access to the mobile device.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

FIGS. 4A-4C are sample graphical representations of the accelerometer signals for different activities performed by a mobile device user.

DETAILED DESCRIPTION OF THE DRAWINGS

Figure 1:
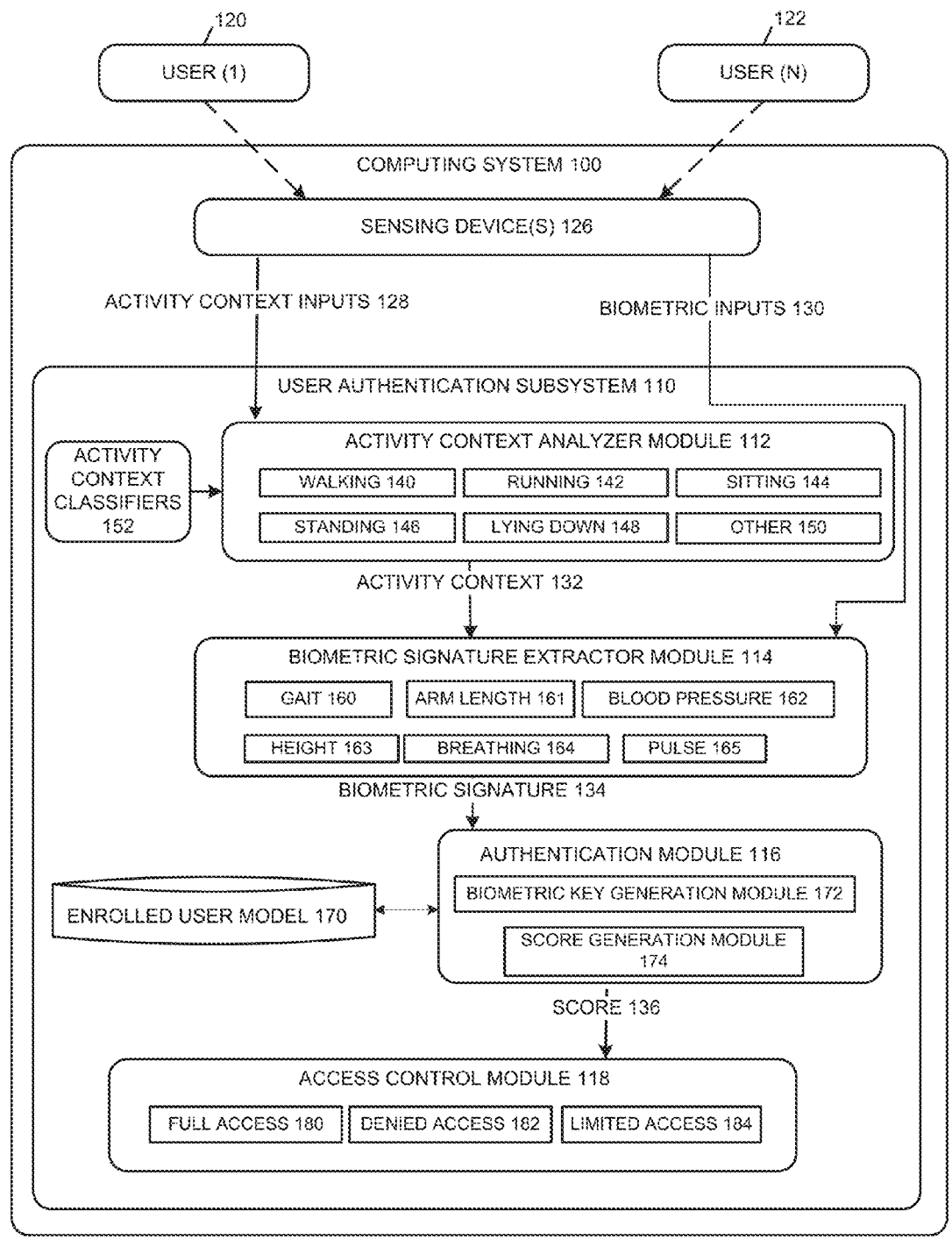
FIG. 1 is a simplified module diagram of at least one embodiment of a computing system including a user authentication subsystem.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Using the sensors of a mobile device, a system can capture user specific device movement signatures and associate these signatures to phone operations such as unlock the phone, send out a message, activate a sensor, or call a number. However, because user specific device dynamics are unique, the system cannot always confidently identify a user. To further reduce false alarm rates, the system can provide a verification request by the phone, such as through a pre-defined pattern of vibration. Moreover, even if an authorized user has unlocked the phone, today's devices have no way to verify that the authorized user is continuing to use the device. For instance, the authorized user may hand the phone over to a friend or family member, or the device may be picked up by a stranger (as in the case where the authorized user may have accidentally left their phone somewhere).

Embodiments of the technology disclosed herein can utilize constraints imposed by the human physicality on the dynamics of the mobile device to make anthropometric measurements of the human body. These measurements are then fused with the distinctive motion signature during a particular mobile device related activity (e.g., picking up, putting down, typing, etc.) for authentication of the user. The determination of human physical measurements for device motion and also the use of motion signatures in the context of device related activity are distinctive aspects of the system. The system extracts both physical traits (e.g., arm length, height, gait, pulse rate, blood pressure, etc.) and style of the user (e.g., picking up, putting down, texting, etc.).

Referring now to FIG. 1, a number "N" (where N is a positive integer) of participants 120, 122 may interact with the computing system. A computing system 100 is equipped with one or more sensing devices 126, which track the participants 120, 122 and capture input data including activity context inputs 128 and biometric inputs 130 relating to the participants' handling or use of the computing system. A user authentication subsystem 110 embodied in the computing system 100 analyzes and interprets the inputs 128, 130, and identifies therefrom the activity context 132 and biometric signature 134 expressed by one or more of the participants 120, 122 over time and in a substantially continuous fashion.

The illustrative user authentication subsystem 110 assesses the level of access control via access control module 116 based on the score 136 generated by authentication module 116. Using the activity context 132, the user authentication subsystem 110 selects a biometric signature 134 of the user 120 or 122, which is passed to the authentication module 116 to generate score 136. Score generation module 174 compares the biometric signature 134 to a stored biometric signature key found in the enrolled user model 170. In the event that a match is not found, a new key is generated by the biometric key generation module 172 and is stored in the enrolled user model 170. The generated score 136 represents a confidence score. Score 136 is then passed to the access control module 116 of the user authentication subsystem 110 to provide access to one or more applications of the computing system 100.

As indicated above, the participants 120 and 122 include at least one human participant. The computing system 100 includes, but is not limited to, electronic devices (e.g., smart phones, tablet computers, or other electronic devices). In general, the interaction or activity context by the participants with the computing system indicated by the dashed lines between, for example, user 120 and sensing device 126, prompt the user authentication subsystem to perform authentication steps. In the event that a user is not interacting with a device (i.e., the computing system 100 is resting on a table or riding in a car), the sensors 126 would detect this and authentication steps would not be performed.

The sensing device(s) 126 is/are configured to capture or collect activity contexts and biometric data related to the user or participant. For ease of discussion, the term "capture" may be used herein to refer to any suitable technique(s) for the collection, capture, recording, obtaining, or receiving of data from the sensing device(s) 126 and/or other electronic devices or systems. In some cases, one or more of the sensing devices 126 may be located remotely from the user authentication subsystem 110, and thus the user authentication subsystem 110 may obtain or receive the activity context data and biometric signature data by electronic communications over one or more telecommunications and/or computer networks (using, e.g., "push," "pull," and/or other data transfer methods).

Activity context, means, generally, that at least one type of data is captured by at least one sensing device 126 based on what the user is currently doing (e.g., walking, running, sitting, or laying down). For example, the activity context data may include motion or other types of data related to motion. Biometric signature means, generally, that at least one type of data is captured by at least one sensing device 126 based on the user's unique physiological and/or physical characteristics (e.g., gait, height, arm length, breathing rate, blood pressure, pulse, etc.).

The sensing device(s) 126 may thus include, for instance, a motion sensor or motion sensing system, an accelerometer, a proximity sensor, a gyroscope, an electronic compass, a proxemics sensor, a temperature sensor, a physiological sensor (e.g., heart rate and/or respiration rate sensor), and/or any other type of sensor that may be useful to capture data that may be pertinent to the collection of activity context and biometric signature information. In some cases, one or more of the sensing devices 126 may be positioned unobtrusively, e.g., so that the participants 120, 122 are not distracted by the authentication process. In some cases, one or more of the sensing devices 126 may be attached to or carried by one or more of the participants 120, 122. For instance, physiological sensors worn or carried by one or more of the participants 120, 122 may produce data signals that can be analyzed by the user authentication subsystem 110. Additionally, in some cases, one or more of the sensing devices 126 may be housed together, e.g., as part of a mobile electronic device, such as a smart phone or tablet computer that may be carried by a participant or positioned in an inconspicuous or conspicuous location as may be desired in particular embodiments of the system 100. In any event, the data signals produced by the sensing device(s) 126 provide the activity context inputs 128 and/or the biometric inputs 130 that are analyzed by the user authentication subsystem 110.

The illustrative user authentication subsystem 110 is embodied as a number of computerized modules and data structures including an activity context analyzer module 112, a biometric signature extractor module 114, an authentication module 116, an access control module 118, an enrolled user model 170, and one or more activity context classifiers 152. The activity context analyzer module 112 applies the activity context classifiers 152 to the activity context inputs 128 to identify therefrom the activity context 132 expressed by one or more of the participants 120, 122. In some embodiments, the feature classifiers 152 are embodied as statistical or probabilistic algorithms that, for example, take an input "x" and determine a mathematical likelihood that x is similar to a known feature, based on "training" performed on the classifier using a large number of known samples. If a match is found for the input x with a high enough degree of confidence, the data stream is annotated or labeled with the corresponding description, accordingly. Activity contexts include walking 140, running 142, sitting 144, standing 146, lying down 148, or any other 150 suitable activity. The determined activity context 132 is then utilized by biometric signature extraction module 114 to select the biometric input of biometric inputs 130. Biometric signature extractor module includes sub-modules gait 160, arm length 161, blood pressure 162, height 163, breathing rate 164, and pulse 165. These sub-modules process the stream of biometric inputs to then determine a biometric signature 134 of the user.

Authentication module 116 is in communication with enrolled user model 170 and contains two sub-modules: biometric key generation module 172 and score generation module 174. Based on biometric signature 134, the authentication module either creates a new biometric key using biometric key generation module 172 if the user is consider a "new" user or generates a confidence score by comparing biometric signature 134 to a stored key in enrolled user model 170, which is output as score 136.

The objective of the authentication module 118 is to decrypt and integrate the signature information, compare it with the user model 170, and generate a confidence value for authentication. The authentication module fuses any available physical and behavioral information received from the mobile device to generate the score. The fusion of evidence is carried on two levels: fusion of physical and behavioral modalities and fusion over signatures over time. For illustrative purposes, a dynamic Probabilistic Graphical Model (PGM) for the information fusion and authentication score generation may be used. A PGM is learned for each user with the goal of directly incorporating the structural and transitional knowledge about the identity of the person interacting with the mobile device.

Biometric key generation module 172 may receive the physical and behavioral signatures via biometric inputs 130. This module has a buffer (not shown) to store recent biometric signatures and activity contexts. When the user enters a pin as a claim of identity to "unlock" the device, this module encrypts the identity claim, the available biometric signatures, and corresponding activity contexts and timestamps. The module sends the encrypted information to the enrolled user model 170. The module uses, for example, the SHA-512 secure hash algorithm for encryption.

Access control module 118 may contain a number of sub-modules, e.g., full access 180, denied access 182, and limited access 184. The access control module 118 processes the score 136 and executes one of the sub-modules that provide either full, limited, or no access to one or more features of the mobile device. For example, full access would enable the user to utilize all of the features of a device whereas limited access would provide access only to a few applications (e.g., camera, web browser).

In some embodiments, the modules 112, 114, 116, and 118 may be integrated with the user authentication subsystem 110 (e.g., as part of the same "app"). In other embodiments, one or more of the modules 112, 114, 116, and 118 may be embodied as separate applications (e.g., third-party applications) that interface with the user authentication subsystem 110 via one or more electronic communication networks.

The activity context may be also determined for advanced situational awareness and real-time personal assistance beyond a mere GPS based location report. The continuous detection of a user's activity while the user is in possession of the device provides a myriad of applications. Beyond the utilization of a user's activity context for continuous authentication, embodiment of the present invention may also be used for providing alerts. Based on certain detected activity contexts, specified alerts may be generated based on predetermined alert setting configurations as set by the device user, or a third party service. Using the aforementioned sensors, an alert may be generated based on certain situations. Non-limiting examples include, but are not limited to, an alert generated in response to the detection of a predetermined activity context (e.g., if an elderly person falls, if a firefighter falls or becomes still, police activity (e.g., chasing a suspect, firing of a weapon)) and providing help accordingly as needed with respect to specific alerts. The activity context detection module may be further enhanced by taking into account data received from further devices, like a body camera or a GoPro camera, or the like. Detected alerts may then be aggregated for later use. Later use includes, but is not limited to, the creation of a diary or log of the alerts and any type of collected data that may have existed at the time of or close in time to the detected alert. The alerts may be logged in a daily, weekly, or monthly report, or any specific time period. For example, an alert event may be marked for subsequent review with respect to a video creation module for video editing.

Figure 2:
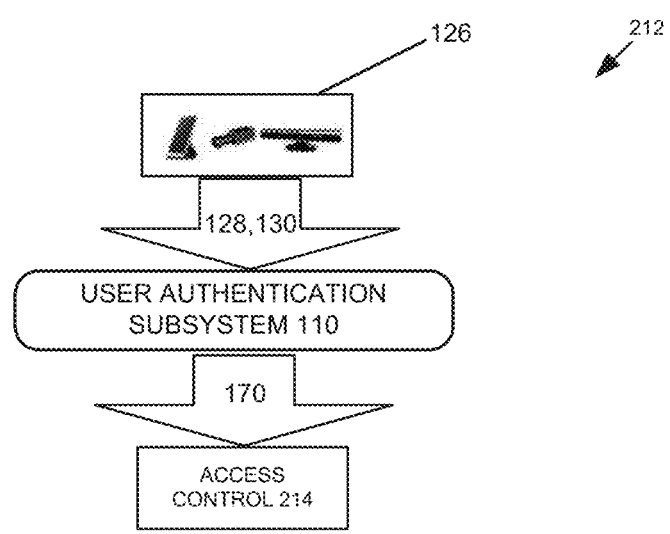
FIG. 2 is a simplified illustration of the operation of at least one embodiment of the user authentication subsystem of FIG. 1 to process activity context data and biometric signature data.

Referring now to FIG. 2, an illustration of instance of events 212 of authentication and access control 214 that may be generated by the user authentication subsystem 110 is shown. The participant (not shown) is observed by one or more of the sensing devices 126 over time during interaction with the mobile device. The activity context and biometric inputs 128, 130 (e.g., walking, blood pressure, gait) are analyzed by the user authentication subsystem 110. As a result of its analysis, the user authentication subsystem 110 generates the output 170 based on the inputs 128, 130 and access control 214 is determined.

Figure 3:
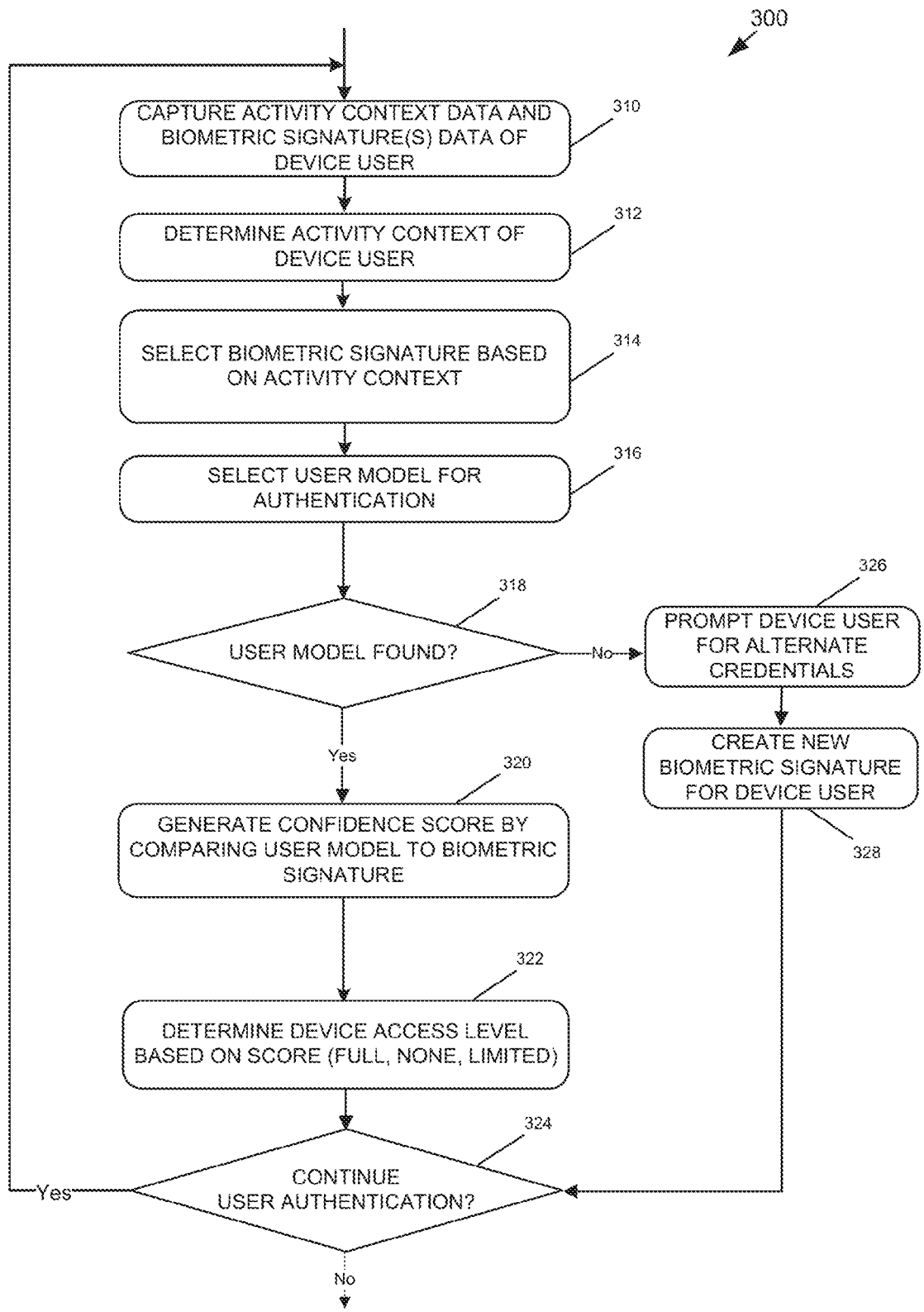
FIG. 3 is a simplified flow diagram of at least one embodiment of a method by which the user authentication subsystem of FIG. 1 may perform user authentication.

Referring now to FIG. 3, an illustrative method 300 for performing user authentication is shown. The method 300 may be embodied as computerized programs, routines, logic and/or instructions of the user authentication subsystem 110, for example. At block 310, the method 300 captures activity context data and biometric signature(s) of the participants using the sensing device(s) 126 as described above. At block 312, the method 300 determines the activity context of the user using the activity context analyzer module 112. At block 314, the method 300 selects a biometric signature based on the activity context 134. At block 316, the method 300 by the authentication module 116 selects a signature key (i.e. user model) from enrolled user model 170. If a user model is found, the method moves to block 320 and generates a confidence score by comparing the found user model biometric key to the biometric signature 134. At block 322, the method 300 determines a level of access by the access control module based on the confidence score 136. As long as the device is still in use, the decision "Yes" will be selected at block 324. In the event at block 318 that a user model is not found ("No"), then the method 300 would move to block 326 to prompt the user for alternate credentials. At block 328, the biometric key generation module 172 would create a new biometric key which is then stored in the enrolled user model for future use. Method 300 would then move to block 324 and the authentication process would continue. Continuous authentication is realized by repeating the steps of authenticating at regular intervals, like every two minutes, or the like. In one embodiment, the regular interval is any discrete time interval (i.e., sampling rate) that could be based on test results, configured by the user, or triggered by a certain event, like a change in activity context.

Figure 4B:
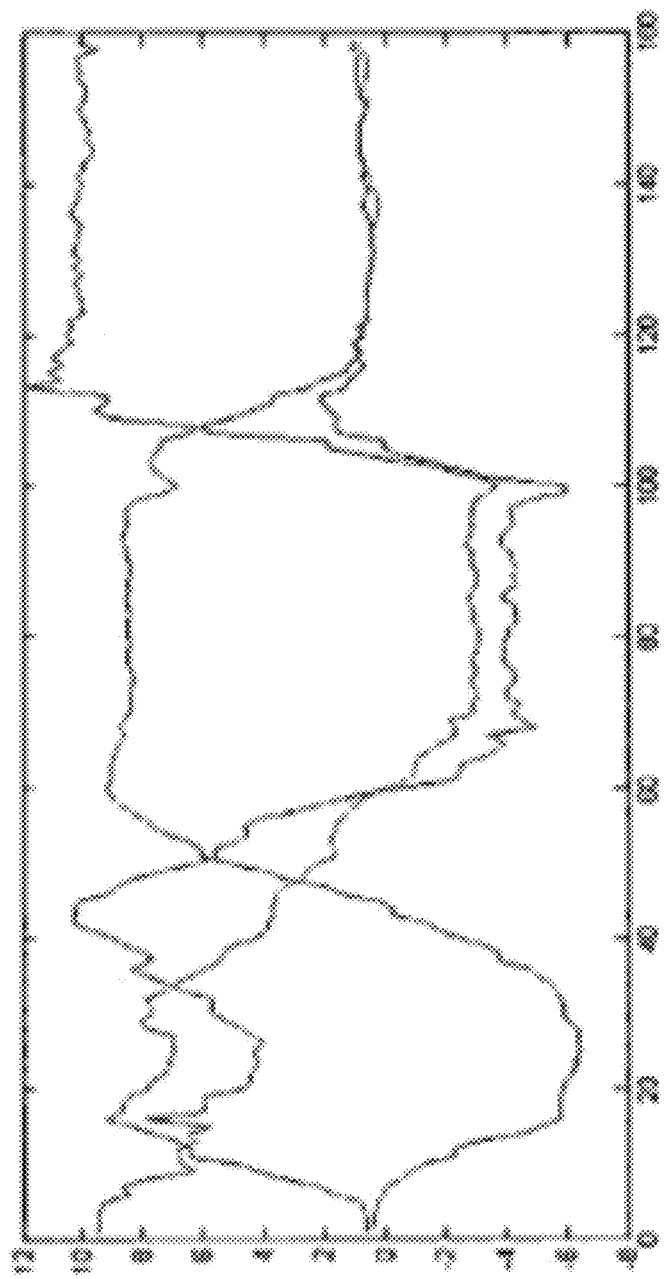
Figure 4C:
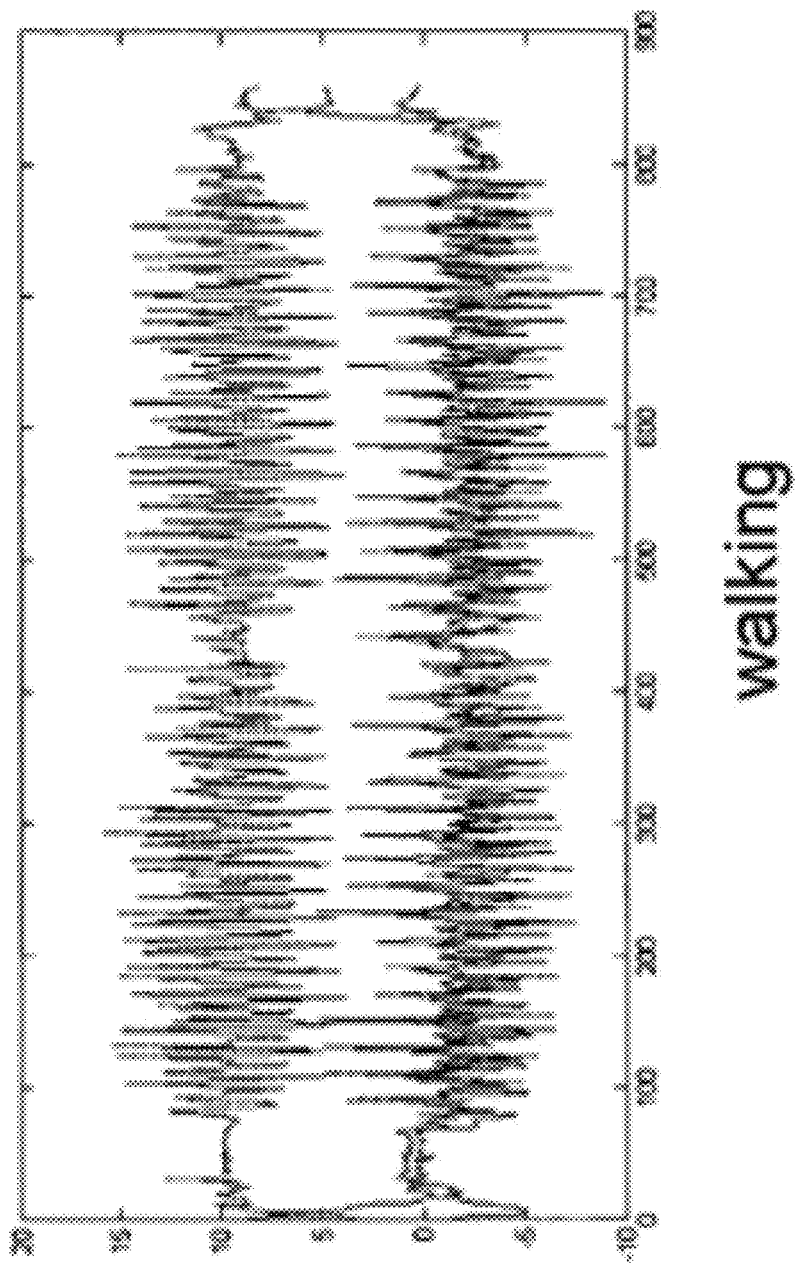

Referring now to FIGS. 4A, 4B, and 4C, an illustration of accelerometer signals for three activities are shown. The first row shows the signal in XYZ dimensions and the second row shows its magnitude. Signals are very different for different activities, and the proposed system can automatically differentiate between them. For example, the activity context analyzer module 112 detects usage activity of device (i.e., is the device being picked up or put down, is it in the pocket of a walking person or a sitting person). Some common contexts/activities that are detected include, but are not limited to, walking, running, sitting down, sitting still, standing up, standing still, lying down, climbing stairs, descending stairs, etc. If the system detects the activity of a phone pickup, the pickup style and anthropometry signatures will be extracted. Depending on the context, the biometric signature extraction extracts the user's particular behavior or "style" based biometric signature and estimates the user's physical properties like arm length, height, or gait characteristics. The biometric signature extractor extracts the user's behavior from mobile device dynamics for each action context. Fine grained user behavior features are extracted from all three sources of dynamics data. Extracted features include filters over the dynamic signal including auto-regressive models, HAAR filters, and statistical features of signals computed over multiple length time windows consisting of mean, standard deviation, variance, interquartile range (IQR), mean absolute deviation (MAD), and correlation between axes, entropy, and kurtosis. In order to select the most discriminative features and to reduce the total amount of data required for authentication, automatic feature selection is used to obtain the behavior signature for each activity. Use of this action context as set forth previously makes fine grained authentication possible because mobile device dynamics are different under different activities, even for the same person, as demonstrated by FIGS. 4A, 4B, and 4C.

Figure 5:
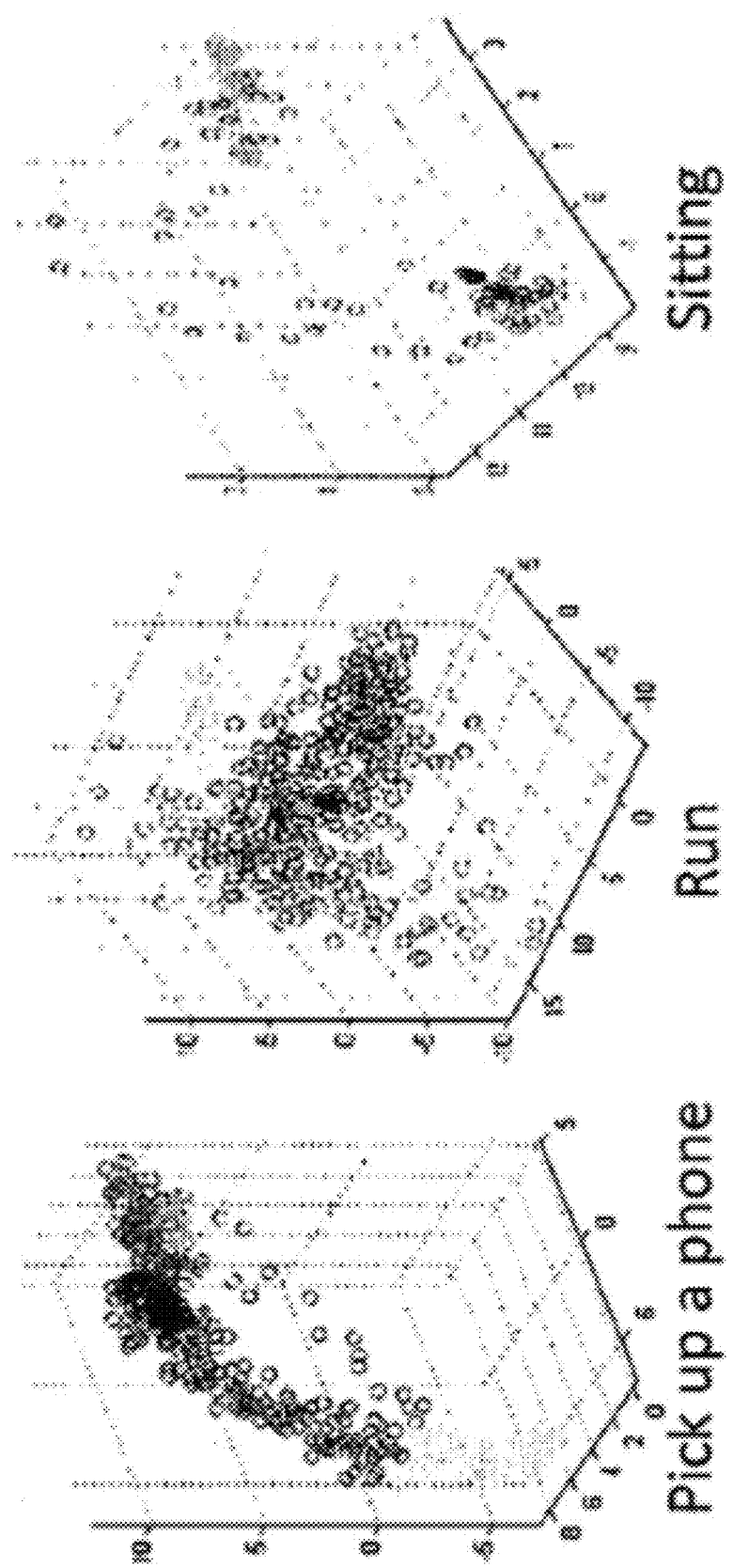
FIG. 5 is a sample graphical representation of the accelerometer signals gathered for activities "Pick-up a phone call,", "Running,", and "Sitting down."
Figure 6:
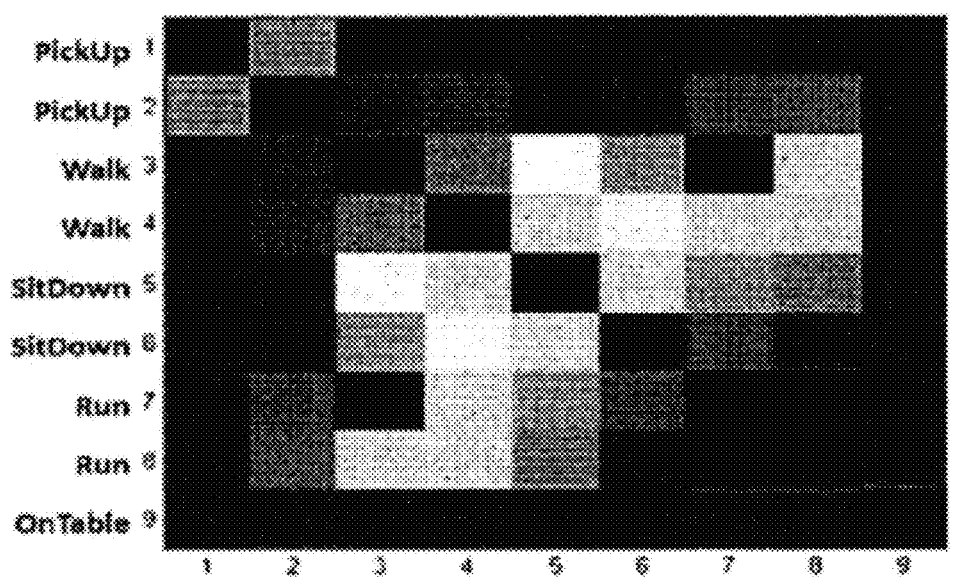
FIG. 6 is a sample dissimilarity matrix between five contexts performed by two users.

Referring now to FIG. 5 and FIG. 6, an illustration of accelerometer feature data for activities "pick-up a phone", "running", and "sitting" is shown. FIG. 5 shows results for activity detection in which sensor data was collected for five activities, with two different users. The data for each activity is split into two parts with each part obtained from a different user. FIG. 5 shows the distribution of features for three different activities. FIG. 6 shows a dissimilarity matrix between the different activities. The distance between the same activities carried out by different users is less than the distance between different activities carried out by the same users.

Figure 7:
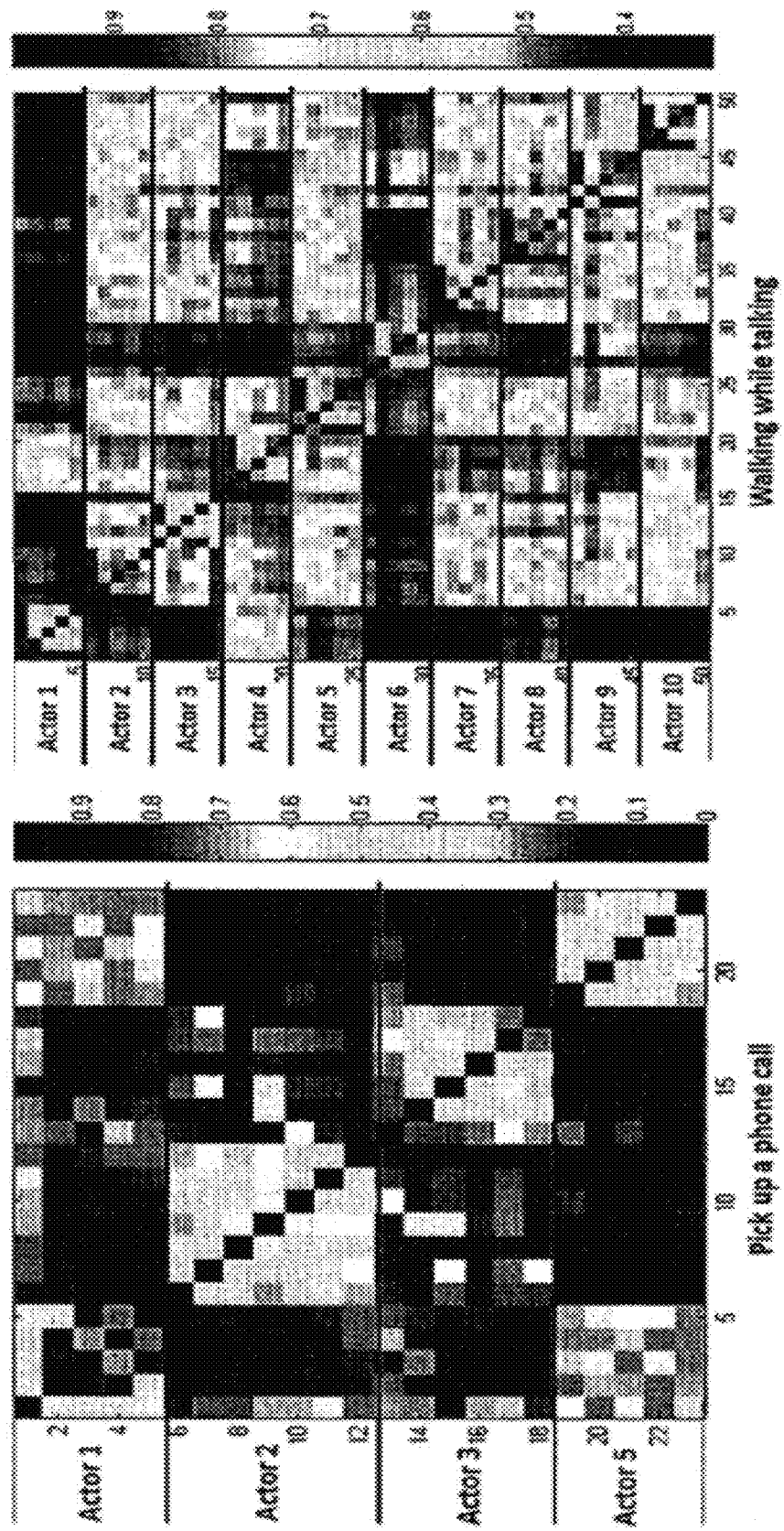
FIG. 7 is a sample dissimilarity matrix for intra-class instances.

FIG. 7 illustrates a dissimilarity matrix for intra-class instances. The left panel shows 23 instances of "pick up a phone call" performed by five actors and the right panel shows 50 instances of "walking while talking" performed by ten different actors. A Gaussian mixture model is fit to every single instance of mobile device use of one actor in the same activity context. The Hettinger distance between the mixture models is used to compute dissimilarity between the activity samples.

Figure 8:
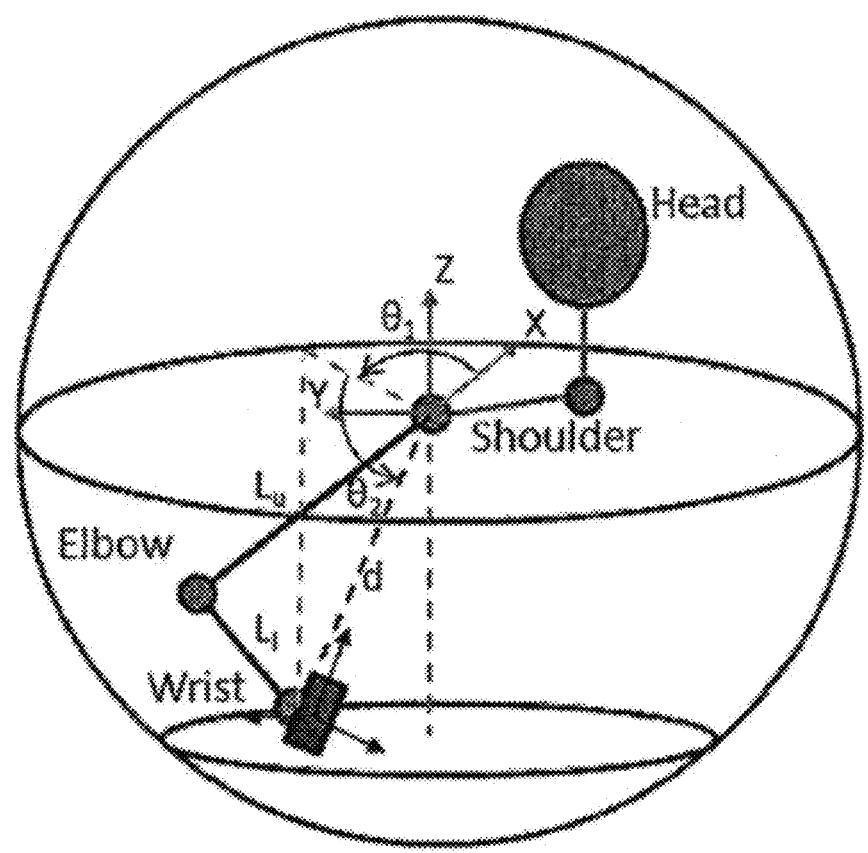
FIG. 8 is an example spherical workspace pivoted at the shoulder joint.

FIG. 8 illustrates a spherical workspace for anthropometry. The anthropometric submodules 161, 163 of biometric signature extractor module 114 would extract at least two types of physical measurements of the device user. Measurements would include the measurements related to length of upper and lower arm of the user and measurements related to the gait and height of the person. Given the position and orientation of the hand and knowing the limb lengths, the type and number of joints (i.e., degrees of freedom), the required motion of the joints can be recovered using inverse kinematics. With respect to FIG. 8, the anthropomorphic unknowns for arm lengths are the fixed parameters for a specified user. The variables characterizing the motion of the end-effector are the two shoulder angles, the radial distance from the shoulder (d) and the absolute orientation of the palm (no wrist movement). The elbow posture can be further abstracted as an elevation angle using learned response functions. The user's gait characteristics are computed when the user is walking while carrying the device. Gait characteristics utilized include, but are not limited to, gait cycle frequency, stride symmetry, regularity, cadence, step length, and gait symmetry. Accurate estimation of gait features is achieved by exploiting the periodic nature of human walking and computing the features over many walking steps. Basic prerequisites for gait analysis are the assessment of spatio-temporal gait parameters and the analysis of movements within subsequent stride cycles. The walking cycles are extracted based on either frequency domain ideas or detecting maxima in the raw signal. Gait cycle detection based on peak detection methods are employed. Once the cycle is known, then the stride length is computed from the accelerometer data. The stride length is directly related to the height of the person (i.e., Height=stride length*1.78, with a standard deviation of +−0.8). The gait cycles are registered and a time-normalized representation is extracted. Each signature is converted to functional data, which is then smoothed and registered to arrive at a single statistical functional model.

Figure 9:
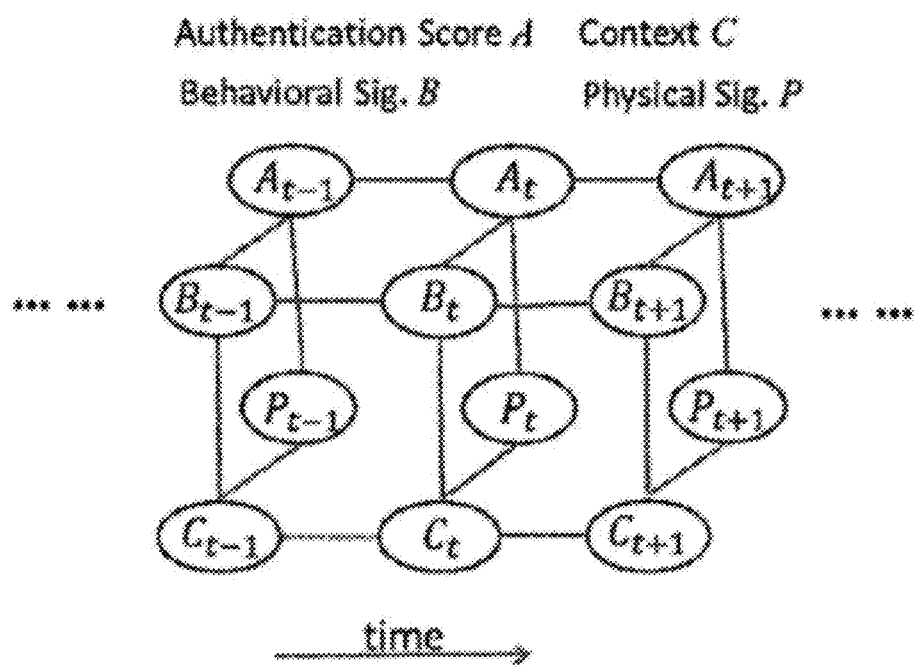
FIG. 9 is a probabilistic graphical model for context sensitive multi-cue user authentication.

Referring now to FIG. 9, an illustration of a PGM model for a user is shown. The dynamic graphical model integrates the contextual, physical, and behavioral information over time to generate the authentication score. The PGM parameter learning takes place during the user enrollment phase (key generation 172). The user goes through natural interactions with the mobile device. The activity context and the extracted physical and behavioral signatures are extracted and stored for training the PGM.

Figure 10:
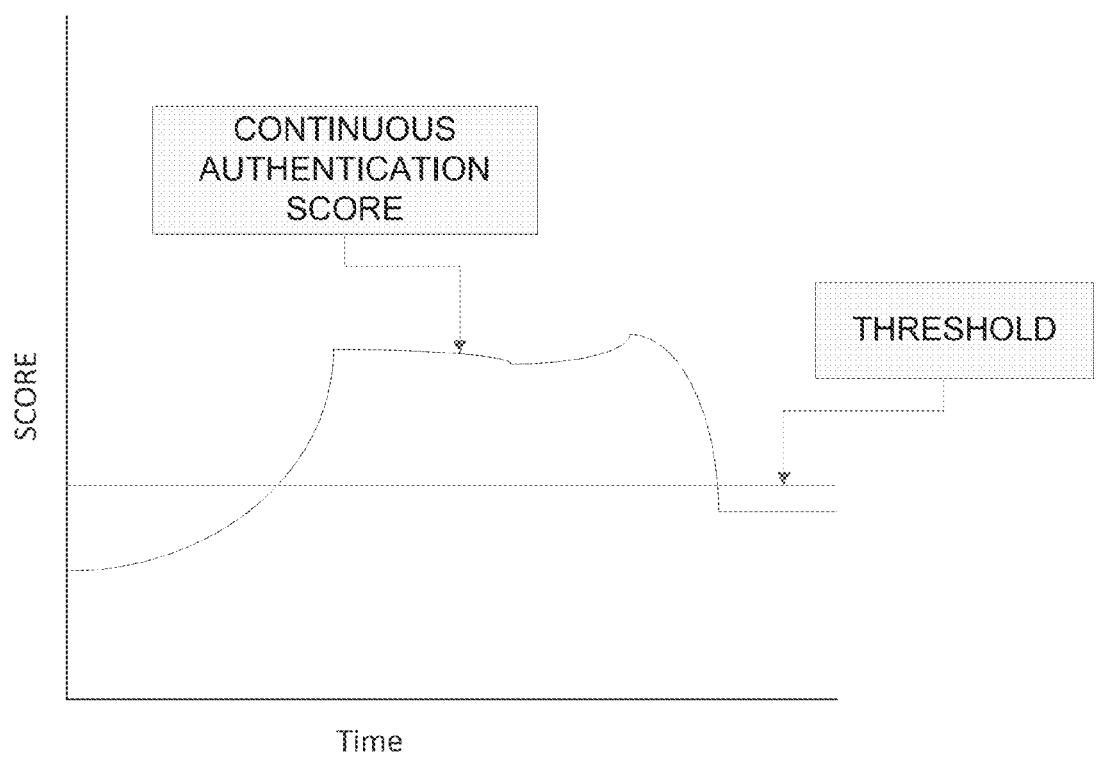
FIG. 10 is a simplified graphical plot of continuous score authentication.

Referring now to FIG. 10 illustrates a use example of a continuous authentication process over time. The x-axis represents time and the y-axis represents the score. A threshold is shown for exemplary purposes where when the score is above the threshold, full access is given to the mobile device and when the score dips below this threshold, no access is given. In an alternative embodiment, when the score is within a certain range of the threshold, limited access is given. Turning back to the example of FIG. 10, where the plot of the score drops dramatically below the threshold, this represents an exemplary security event where a perpetrator may have picked up the user's phone. In this instance the perpetrator's gait would not match a verified signature in enrolled user model 170 and the device would deny the perpetrator access and the device would be "locked."

Disclosed is a non-intrusive and continuous verification of a user's identity from mobile dynamics. For example, the inputs into the system are gait signals composed from 3D linear acceleration and 3D gyroscope sampled at 100 Hz from a mobile device. The output from the system is an authentication score showing how likely the user of the device is actually authorized to use the device by comparing the obtained gait signals with previously enrolled gait signals. Unlike traditional gait-based authentication methods that directly compare signatures extracted from movement data, the system filters out non-gait signals through activity detection. Non-gait signal filtering improves the authentication performance through temporal score fusion.

IMPLEMENTATION EXAMPLES

Figure 11:
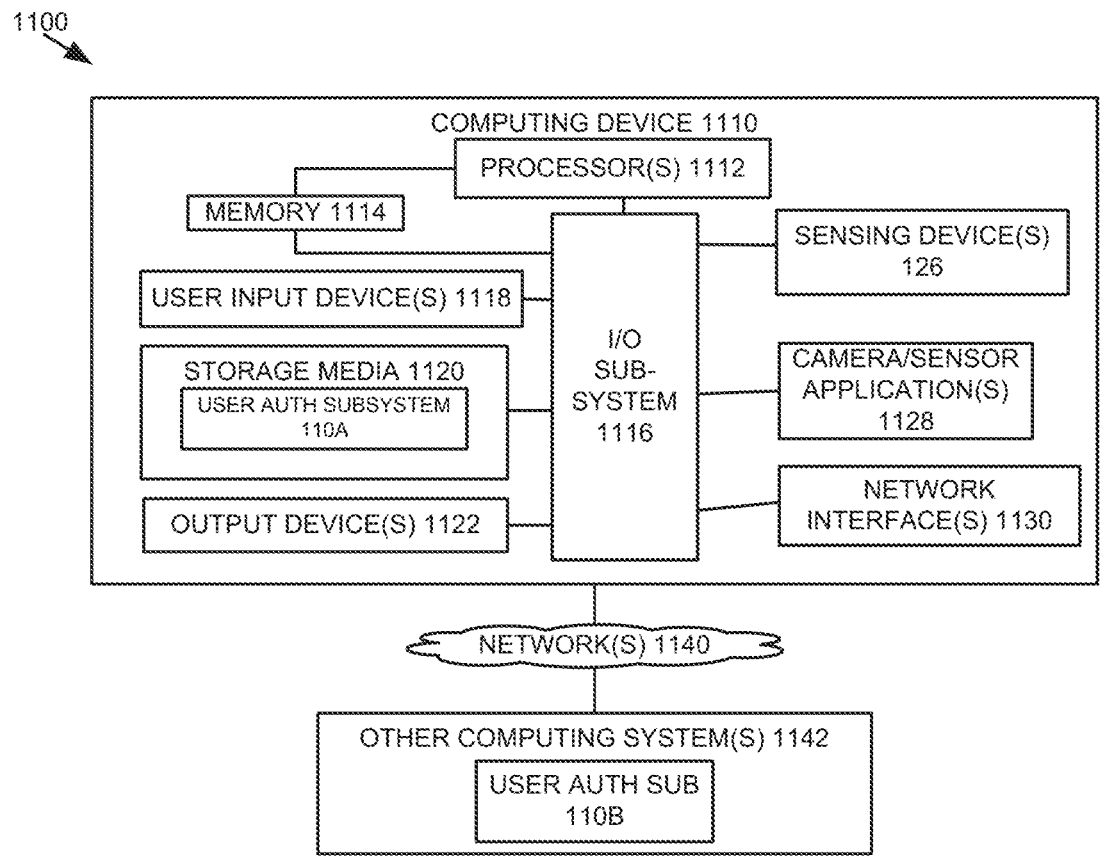
FIG. 11 is a simplified block diagram of an exemplary computing environment in connection with which at least one embodiment of the user authentication subsystem of FIG. 1 may be implemented.

Referring now to FIG. 11, a simplified block diagram of an exemplary hardware environment 1100 for the computing system 100, in which the user authentication subsystem 110 may be implemented, is shown. The illustrative implementation 1100 includes a computing device 1110, which may be in communication with one or more other computing systems or devices 1142 via one or more networks 1140. Illustratively, a portion 110A of the user authentication subsystem 110 is local to the computing device 1110, while another portion 110B is distributed across one or more of the other computing systems or devices 1142 that are connected to the network(s) 1140. For example, in some embodiments, portions of the authentication module 116 may be stored locally while other portions are distributed across a network (and likewise for other components of the user authentication subsystem 110). In some embodiments, however, the user authentication subsystem 110 may be located entirely on the computing device 1110. In some embodiments, portions of the user authentication subsystem 110 may be incorporated into other systems or interactive software applications. Such applications or systems may include, for example, operating systems, middleware or framework (e.g., application programming interface or API) software, and/or user-level applications software (e.g., a virtual personal assistant, another interactive software application or a user interface for a computing device).

The illustrative computing device 1110 includes at least one processor 1112 (e.g. a microprocessor, microcontroller, digital signal processor, etc.), memory 1114, and an input/output (I/O) subsystem 1116. The computing device 1110 may be embodied as any type of computing device such as a personal computer (e.g., desktop, laptop, tablet, smart phone, body-mounted device, etc.), a server, an enterprise computer system, a network of computers, a combination of computers and other electronic devices, or other electronic devices. Although not specifically shown, it should be understood that the I/O subsystem 1116 typically includes, among other things, an I/O controller, a memory controller, and one or more I/O ports. The processor 1112 and the I/O subsystem 1116 are communicatively coupled to the memory 1114. The memory 1114 may be embodied as any type of suitable computer memory device (e.g., volatile memory such as various forms of random access memory).

The I/O subsystem 1116 is communicatively coupled to a number of components including one or more user input devices 1118 (e.g., a touchscreen, keyboard, virtual keypad, microphone, etc.), one or more storage media 1120, one or more output devices 1122 (e.g., speakers, LEDs, etc.), the one or more sensing devices 126 described above, one or more camera or other sensor applications 1128 (e.g., software-based sensor controls), and one or more network interfaces 1130. The storage media 1120 may include one or more hard drives or other suitable data storage devices (e.g., flash memory, memory cards, memory sticks, and/or others). In some embodiments, portions of systems software (e.g., an operating system, etc.), framework/middleware (e.g., APIs, object libraries, etc.), and/or the user authentication subsystem 110A reside at least temporarily in the storage media 1120. Portions of systems software, framework/middleware, and/or the user authentication subsystem 110A may be copied to the memory 1114 during operation of the computing device 1110, for faster processing or other reasons.

The one or more network interfaces 1130 may communicatively couple the computing device 1110 to a local area network, wide area network, personal cloud, enterprise cloud, public cloud, and/or the Internet, for example. Accordingly, the network interfaces 1130 may include one or more wired or wireless network interface cards or adapters, for example, as may be needed pursuant to the specifications and/or design of the particular computing system 100. The other computing system(s) 1142 may be embodied as any suitable type of computing system or device such as any of the aforementioned types of devices or other electronic devices or systems. For example, in some embodiments, the other computing systems 1142 may include one or more server computers used to store portions of the enrolled user model 170. The computing system 100 may include other components, sub-components, and devices not illustrated in FIG. 11 for clarity of the description. In general, the components of the computing system 100 are communicatively coupled as shown in FIG. 11 by electronic signal paths, which may be embodied as any type of wired or wireless signal paths capable of facilitating communication between the respective devices and components.

A method for securing a mobile electronic device of a user is disclosed. With a computing system comprising at least the mobile electronic device by one or more sensors in communication with the mobile electronic device, collecting sensor data from which a plurality of different biometric signatures of the user of the mobile electronic device can be derived. Based on at least some of the sensor data, an activity context of the mobile electronic device is determined A biometric signature based on the activity context is selected from a plurality of different biometric signatures. A routine is then executed to verify the identity of the user. Based on the identity verification, one or more features of the mobile electronic device is made available to the user. A different biometric signature is selected in response to a change in the activity context of the mobile electronic device, and the routine to verify the identity is re-executed.

A confidence score indicative of a likelihood that the selected biometric signature is associated with the user based on the verification step. Over time, access privileges to the device may be changed in accordance with the confidence score. When a change in activity context is detected, the confidence score is re-computed. The confidence score is updated based on a detection of a different user carrying or handling the device. The plurality of different biometric signatures of the user comprises data indicative of at least two of: gait signature, arm length, height, breathing rate, pulse rate, or blood pressure of a user carrying the mobile electronic device. The activity context comprises data indicative of at least one of: walking, running, sitting down, sitting still, standing up, standing still, lying down, ascending stairs, or descending stairs by a user carrying the mobile electronic device. If the identity verification is unsuccessful the user is prompted for another form of user-identifying information, like a PIN code. Based on successful verification of the user based on the alternative form of user-identifying information, a new biometric signature is a created and stored for the user.

GENERAL CONSIDERATIONS

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into submodules, sub-processes or other units of computer code or data as may be required by a particular design or implementation of the user authentication subsystem 110.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected. For example, while certain aspects of the present disclosure may be described in the context of a human-human interaction, it should be understood that the various aspects are applicable to human-device interactions and/or other types of human interactions.

The invention claimed is:

1. A method for securing a mobile electronic device comprising at least a computing system, the method comprising:
   by one or more sensors in communication with the mobile electronic device, collecting sensor data from which a plurality of different biometric signatures of a user of the mobile electronic device can be derived;
   based on at least some of the sensor data, determining an activity context of the user of the mobile electronic device, the activity context relating to a current activity of the user in relation to the mobile electronic device, including at least walking or running;
   selecting a biometric signature of the plurality of different biometric signatures based on the activity context of the user of the mobile electronic device;
   according to the selected biometric signature, executing a routine to verify the identity of the user;
   adjusting one or more access privileges for access to one or more features of the mobile electronic device in response to execution of the routine to verify the identity of the user; and
   selecting a different biometric signature in response to a change in the activity context of the user of the mobile electronic device, and executing the routine to verify the identity of the user with the different biometric signature.

2. The method of claim 1, comprising computing a confidence score indicative of a likelihood that the selected biometric signature is associated with the user, and selectively configuring the mobile electronic device based on the confidence score.

3. The method of claim 2, comprising, over time, changing one or more access privileges of the mobile electronic device in response to changes in the confidence score.

4. The method of claim 2, comprising detecting a change in the activity context and re-computing the confidence score in response to the change in the activity context.

5. The method of claim 2, comprising detecting a different user carrying the mobile electronic device based on a change in the confidence score.

6. The method of claim 1, wherein the plurality of different biometric signatures of the user comprises data indicative of at least two of: gait signature, arm length, height, breathing rate, pulse rate, or blood pressure of a user carrying the mobile electronic device; and
   wherein the activity context comprises data indicative of at least one of: walking, running, sitting down, sitting still, standing up, standing still, lying down, ascending stairs, or descending stairs by a user carrying the mobile electronic device.

7. The method of claim 1, wherein the activity context triggers an alert and creates an event in a log.

8. The method of claim 1, comprising, in response to an unsuccessful identity verification of the user, prompting the user for another form of user-identifying information; and in response to a successful identity verification of the user of the mobile electronic device based on the other form of user-identifying information, creating a biometric signature for the user.

9. The user authentication subsystem of claim 1, wherein the activity context triggers an alert and creates an event in a log.

10. The user authentication subsystem of claim 1, comprising, in response to an unsuccessful identity verification of the user, prompting the user for another form of user-identifying information; and in response to a successful identity verification of the user of the mobile electronic device based on the other form of user-identifying information, creating a biometric signature for the user.

11. A user authentication subsystem for a mobile electronic device, the user authentication system comprising a plurality of instructions embodied in one or more non-transitory machine accessible storage media and configured to cause a computing system of the mobile electronic device to, at regular time intervals:
    by one or more sensors in communication with the mobile electronic device, collect sensor data from which a plurality of different biometric signatures of a user of the mobile electronic device can be extracted;
    based on at least some of the sensor data, determine an activity context of the user of the mobile electronic device, the activity context relating to a current activity of the user in relation to the mobile electronic device, including at least walking or running;
    select a biometric signature of the plurality of different biometric signatures based on the activity context of the user of the mobile electronic device;
    according to the selected biometric signature, execute a routine to verify the identity of the user;
    adjust one or more access privileges for access to the mobile electronic device based on output of the routine to verify the identity of the user; and
    select a different biometric signature in response to a change in the activity context of the user of the mobile electronic device, and execute the routine to verify the identity of the user with the different biometric signature.

12. The user authentication subsystem of claim 11, configured to compute a confidence score indicative of a likelihood that the selected biometric signature is associated with the user, and configure the mobile electronic device based on the confidence score.

13. The user authentication subsystem of claim 12, configured to, over time, adjust one or more access privileges of the mobile electronic device in response to changes in the confidence score.

14. The user authentication subsystem of claim 12, configured to detect a change in the identity of the user carrying the mobile electronic device in response to a change in the confidence score.

15. The user authentication subsystem of claim 12, configured to detect a change in the activity context and re-compute the confidence score in response to the change in the activity context.

16. The user authentication subsystem of claim 11, wherein the plurality of different biometric signatures of the user comprises data indicative of at least two of: gait signature, arm length, height, breathing rate, pulse rate, or blood pressure of the user carrying the mobile electronic device; and
    wherein the activity context comprises data indicative of at least one of: walking, running, sitting down, sitting still, standing up, standing still, lying down, ascending stairs, or descending stairs by the user carrying the mobile electronic device.

17. A computing system comprising at least a mobile electronic device, the computing system comprising:
one or more hardware processors;
one or more sensors coupled to the one or more processors; and
memory comprising instructions executable by the one or more processors to cause the mobile electronic device to, over time:
receive sensor data from which a plurality of different biometric signatures of a user of the mobile electronic device can be extracted;
based on at least some of the sensor data, determine an activity context of the user of the mobile electronic device, the activity context relating to a current activity of the user in relation to the mobile electronic device, including at least running or walking;
select a biometric signature of the plurality of different biometric signatures based on the activity context of the user of the mobile electronic device;
with the selected biometric signature, execute a routine to verify the identity of the user;
adjust one or more access privileges of the mobile electronic device in response to output of the routine to verify the identity of the user; and
select a different biometric signature in response to a change in the activity context of the user of the mobile electronic device, and execute the routine to verify the identity of the user with the different biometric signature.

18. The computing system of claim 17, wherein the memory comprises instructions configured to cause the mobile electronic device to compute a confidence score indicative of a likelihood that the selected biometric signature is associated with the user, configure access to the mobile electronic device based on the confidence score, detect a change in the confidence score indicative of a change in the identity of the user carrying the mobile electronic device, and re-configure access to the mobile electronic device in response to the detected change in the identity of the user carrying the mobile electronic device.

* * * * *